J. P. LAVIGNE.
VALVE HANDLE.
APPLICATION FILED DEC. 6, 1915.
1,193,905.
Patented Aug. 8, 1916.
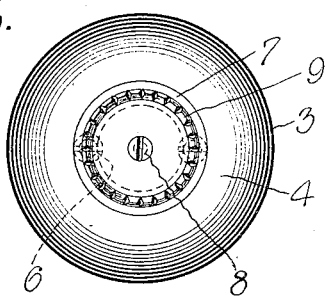
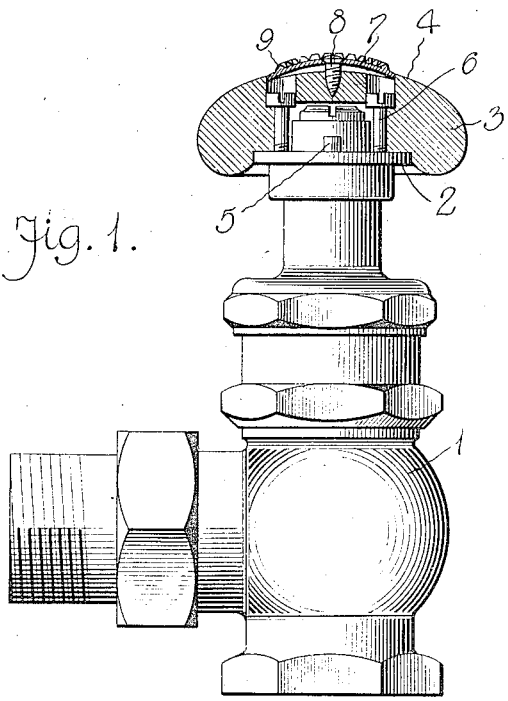
Witnesses
Chas W Stauffer
Arthur F. Draper
Inventor
Joseph P. Lavigne,
By

UNITED STATES PATENT OFFICE.

JOSEPH P. LAVIGNE, OF DETROIT, MICHIGAN.

VALVE-HANDLE.

1,193,905.  Specification of Letters Patent.  Patented Aug. 8, 1916.

Application filed December 6, 1915. Serial No. 65,218.

*To all whom it may concern:*

Be it known that I, JOSEPH P. LAVIGNE, a citizen of the United States of America, residing at Detroit, in the county of Wayne and State of Michigan, have invented certain new and useful Improvements in Valve-Handles, of which the following is a specification, reference being had therein to the accompanying drawings.
In the application of handles to steam valves, hot water cocks and the like, and more particularly on lines in heating systems of buildings where the valve frequently becomes a step on which persons operating the system occasionally stand, it is desirable not only that the handle should be capable of withstanding such rough usage without injury but also at the same time should be a heat insulated grip so that in manipulating a valve, the user does not become burned.

This invention relates to handles for valves and to an arrangement thereof whereby they are shielded from injury under rough usage while they afford means for controlling or regulating the valves without inconvenience to the users.

The invention consists in the matters hereinafter set forth, and more particularly pointed out in the appended claims.
In the drawings, Figure 1 is a view of a valve provided with a handle shown in cross section, that embodies features of the invention; Fig. 2 is a plan view of the handle.

Referring to the drawing, a valve 1 of conventional type has a member 2 which is commonly styled the plate and is used to turn the stem or other means whereby the closure of the valve is operated. A handle 3 of wood, wood fiber, vulcanized rubber or other good heat insulating material has the outer conformation desired for the particular valve to which it is applied, and preferably has a crowned or convex upper surface 4. It is suitably recessed and counterbored on its under side to receive the plate 2 and preferably is arranged to engage with dowels 5 which lock it to rotate with the plate 2. Holding screws 6 that are well countersunk into the upper surface retain the handle from displacement. A crowned or convex guard or shield 7 of suitable material, preferably of metal, caps the handle to which it is held by a screw 8 or the like that enters the body of the handle but is insulated from contact with the metal parts of the valve which the handle envelops. As herein indicated, this plate may have a roughened tread surface indicated at 9. Whether the handle is crowned or not, the tread or shield is disposed to lie above the plane of the handle. As a result of this construction, a handle is obtained that is heat insulated from the valve, and that affords a foot rest or step of material that is not damaged by use.

Obviously, changes in the details of construction may be made without departing from the spirit of my invention and I do not care to limit myself to any particular form of arrangement of parts.

What I claim is:—

1. In a valve, a rotatable closure operating member, a handle of insulating material non-rotatably and detachably secured on the closure operating member, and a shield detachably secured on the handle and insulated thereby from the valve.

2. In a valve, a closure operating member, a handle of insulating material mounted thereon, means securing the handle detachably to the member, a shield on the handle, and means securing it thereto as a guard for the handle securing means and in heat insulated relation from the valve.

3. In a valve having a closure stem operating plate, a handle of heat insulated material resting on the plate which it houses, means for securing the handle to the plate, and a shield mounted on the handle to lie in a plane above it and secured to the handle in heat insulated relation from the valve.

4. In a valve, a member for operating the valve closure extending above the valve casing, a handle of heat insulated material forming, a hand grip and non-rotatably engage on the member, securing means insulated through the handle from the upper side and engaging into the member, a shield plate mounted on the handle to extend above the plane thereof and a holding member for the plate entering the handle and plate and the securing member thereof being in heat-insulated relation to the valve.

In testimony whereof I affix my signature in presence of two witnesses.

JOSEPH P. LAVIGNE.

Witnesses:
L. E. FLANDERS,
C. R. STICKNEY.